(12) United States Patent
Yamamoto et al.

(10) Patent No.: US 9,890,277 B2
(45) Date of Patent: Feb. 13, 2018

(54) LIQUID THERMOSETTING RESIN COMPOSITION FOR INSULATING STATOR COIL OF ROTATING ELECTRIC MACHINE

(75) Inventors: Shigeyuki Yamamoto, Tokyo (JP); Takahiro Mabuchi, Tokyo (JP); Kazuki Kubo, Tokyo (JP); Yuhei Awano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 350 days.

(21) Appl. No.: 14/405,528

(22) PCT Filed: Jun. 15, 2012

(86) PCT No.: PCT/JP2012/065358
§ 371 (c)(1),
(2), (4) Date: Dec. 4, 2014

(87) PCT Pub. No.: WO2013/186914
PCT Pub. Date: Dec. 19, 2013

(65) Prior Publication Data
US 2015/0225563 A1   Aug. 13, 2015

(51) Int. Cl.
H02K 1/27 (2006.01)
C08L 63/04 (2006.01)
H02K 3/30 (2006.01)
H02K 15/085 (2006.01)

(52) U.S. Cl.
CPC ............ C08L 63/04 (2013.01); H02K 3/30 (2013.01); H02K 15/085 (2013.01);
(Continued)

(58) Field of Classification Search
CPC ....... H08L 59/688; H08L 63/00; H08L 63/04; H02K 1/276; H02K 1/2766; H02K 15/03;
(Continued)

(56) References Cited

U.S. PATENT DOCUMENTS

2006/0009547 A1* 1/2006 Maeshima ............ C07D 301/14
523/427
2006/0025501 A1* 2/2006 Osada ..................... C08L 63/00
523/457

(Continued)

FOREIGN PATENT DOCUMENTS

JP    63-48323    3/1988
JP    1-275622    11/1989
(Continued)

OTHER PUBLICATIONS

International Search Report issued Sep. 18, 2012, in PCT/JP12/065358 filed Jun. 15, 2012.

*Primary Examiner* — Bernard Rojas
*Assistant Examiner* — Rashad Johnson
(74) *Attorney, Agent, or Firm* — Oblon, McClelland, Maier & Neustadt, L.L.P.

(57) ABSTRACT

The liquid thermosetting resin composition of the present invention comprises an epoxy resin in which at least one selected from the group consisting of a linear epoxy resin having a degree of polymerization of 2 or more and an epoxy acrylate resin and at least one selected from the group consisting of a novolac-type epoxy resin and a naphthalene-type epoxy compound are linked to each other via an ether linkage, and which has a weight average molecular weight of from 2,000 to 10,000. When the liquid thermosetting resin composition of the present invention is used for insulating a stator coil of a rotating electric machine, mechanical characteristics can be improved without causing a reduction in the heat resistance.

14 Claims, 1 Drawing Sheet

(52) U.S. Cl.
CPC ..... *C08L 2201/02* (2013.01); *C08L 2203/206* (2013.01); *C08L 2205/025* (2013.01); *Y10T 29/49009* (2015.01)

(58) Field of Classification Search
CPC .......... H02K 15/085; H02K 3/30; H02K 5/02; Y10T 29/49009
USPC ........................ 29/596, 598; 310/43; 523/400
See application file for complete search history.

(56) References Cited

U.S. PATENT DOCUMENTS

| | | | | |
|---|---|---|---|---|
| 2007/0185287 | A1* | 8/2007 | Itagaki | .................. C08G 59/42 525/524 |
| 2009/0326100 | A1* | 12/2009 | Hamada | ................. C08G 77/14 523/435 |
| 2010/0160494 | A1* | 6/2010 | Yonehama | ................ B32B 7/12 523/400 |
| 2011/0224333 | A1* | 9/2011 | Kitagawa | ........... C08G 73/0644 523/466 |
| 2013/0300223 | A1* | 11/2013 | Kondo | ................. C08L 101/00 310/43 |

FOREIGN PATENT DOCUMENTS

| | | |
|---|---|---|
| JP | 4-55457 | 2/1992 |
| JP | 6-21165 | 3/1994 |
| JP | 9-235358 | 9/1997 |
| JP | 2006-63312 | 3/2006 |

* cited by examiner

LIQUID THERMOSETTING RESIN COMPOSITION FOR INSULATING STATOR COIL OF ROTATING ELECTRIC MACHINE

TECHNICAL FIELD

The present invention relates to a liquid thermosetting resin composition for insulating a stator coil of a rotating electric machine, a rotating electric machine using same, and to a manufacturing method therefor.

BACKGROUND ART

Electric instruments have been required to have higher performance and higher reliability, such as smaller size and higher heat resistance. Along with this, insulating materials used in electric instruments have also been required to have excellent chemical stability at high temperatures. Especially incases where an insulating material is applied to the stator coil of a rotating electric machine for the purpose of insulation, in general, the crosslink density of a cured product is often increased to improve the heat resistance.

For example, Patent Document 1 provides a thermosetting resin composition including at least an aminomaleimide compound obtained through a reaction among an α-ketonitrile compound having at least two α-ketonitrile groups, a maleimide compound having at least two maleimide groups, and an amine having at least two amino groups, to thereby improve the heat resistance.

Patent Document 2 provides an epoxy resin composition including a multifunctional epoxy resin and a curing agent for an epoxy resin, the multifunctional epoxy resin being obtained through a reaction between: a mixture of a bifunctional epoxy resin including as a skeleton a specific bisphenol such as bisphenol A and a resorcinol-based novolac resin; and a specific bisphenol, to thereby improve the mechanical strength and flexibility as well as the heat resistance.

Patent Document 3 provides a resin composition including a bisphenol-based epoxy resin, a cresol novolac-based epoxy resin, and an alicyclic epoxy resin, together with a polysulfide-modified epoxy resin serving as a flexibilizer, to thereby improves the heat resistance and flexibility.

Patent Document 1: Japanese Patent Application laid-open No. 60-152528
Patent Document 2: Japanese Patent Application laid-open No. 63-48323
Patent Document 3: Japanese Patent Application laid-open No. 7-207123

SUMMARY OF INVENTION

Technical Problem

However, while the resin composition described in Patent Document 1 improves the heat resistance by providing a maleimide skeleton, there is a problem in that a cured product of such resin composition is rigid and hence cracks are generated when the thickness increases. In addition, the resin compositions described in Patent Document 2 and Patent Document 3 have improved flexibility to some extent, but the heat resistance is still not sufficient. Therefore, the related-art resin compositions cannot satisfy the mechanical characteristics and heat resistance required of a resin for insulating a stator coil of a rotating electric machine.

Thus, the present invention has been made to solve the problems of the related art, and an object of the present invention is to provide a liquid thermosetting resin composition for insulating a stator coil of a rotating electric machine, which exhibits excellent mechanical characteristics and excellent heat resistance.

Solution to the Problem

In view of the forgoing, the inventors of the present invention, after conducting intensive studies and development for solving the conventional problems described above, have found that a thermosetting resin composition comprising an epoxy resin obtained by previously reacting a specific compound having a stress relaxation skeleton with a specific compound having a rigid skeleton is effective for insulation of a stator coil of a rotating electric machine, to complete the present invention.

That is, a liquid thermosetting resin composition for insulating a stator coil of a rotating electric machine according to the present invention comprises an epoxy resin in which at least one selected from the group consisting of a linear epoxy resin having a degree of polymerization of 2 or more and an epoxy acrylate resin and at least one selected from the group consisting of a novolac-type epoxy resin and a naphthalene-type epoxy compound are linked to each other via an ether linkage, and which has a weight average molecular weight of from 2,000 to 10,000.

Advantageous Effects of the Invention

According to the present invention, it is possible to provide a liquid thermosetting resin composition for insulating stator coils of rotating electric machines, which can exhibit improved mechanical characteristics without causing a reduction in the heat resistance.

DESCRIPTION OF EMBODIMENTS

Embodiment 1

A liquid thermosetting resin composition for insulating a stator coil of a rotating electric machine according to an embodiment of the present invention comprises an epoxy resin which is obtained by reacting at least one compound having a stress relaxation skeleton, which is selected from the group consisting of a linear epoxy resin and an epoxy acrylate resin, with at least one compound having a rigid skeleton, which is selected from the group consisting of a novolac-type epoxy resin and a naphthalene-type epoxy compound, and which has a weight average molecular weight of from 2,000 to 10,000.

Examples of the linear epoxy resin to be used in the embodiment of the present invention include a bisphenol A-type epoxy resin represented by the following formula (1), a bisphenol F-type epoxy resin represented by the following formula (2), a bisphenol AD-type epoxy resin, a brominated bisphenol A-type epoxy resin, a brominated bisphenol F-type epoxy resin, a brominated bisphenol AD-type epoxy resin, an alicyclic epoxy resin, and a brominated alicyclic epoxy resin. One kind of these resins may be used alone, or two or more kinds thereof may be used in combination.

In formula (1), n represents a positive integer.

In formula (2), n represents a positive integer.

In addition, examples of the epoxy acrylate resin to be used in the embodiment of the present invention include a bisphenol A-type epoxy acrylate represented by the following formula (3) as well as a bisphenol F-type epoxy acrylate, a modified bisphenol A-type epoxy acrylate, a modified bisphenol F-type epoxy acrylate, a brominated bisphenol A-type epoxy acrylate, and a brominated bisphenol F-type epoxy acrylate. One kind of these resins may be used alone, or two or more kinds thereof may be used in combination.

In formula (3), n represents a positive integer and R represents H or an alkyl group having 1 to 3 carbon atoms.

In addition, examples of the novolac-type epoxy resin to be used in the embodiment of the present invention include a phenol novolac-type epoxy resin represented by the following formula (4), a cresol novolac-type epoxy resin represented by the following formula (5), a brominated phenol novolac-type epoxy resin, and a brominated cresol novolac-type epoxy resin. One kind of these resins may be used alone, or two or more kinds thereof may be used in combination.

In formula (4), n represents a positive integer.

In formula (5), m represents 1 or 2, n represents a positive integer, R represents H or an alkyl group having 1 to 3 carbon atoms, and X represents a direct linkage or a methylene group having 1 to 3 carbon atoms.

Examples of the naphthalene-type epoxy compound to be used in the embodiment of the present invention include a tetrafunctional naphthalene-type epoxy compound represented by the following formula (6), a bifunctional naphthalene-type epoxy compound represented by the following formula (7), a phenol naphthalene-type epoxy resin, a cresol naphthalene-type epoxy resin, a brominated phenol naphthalene-type epoxy resin, and a brominated cresol naphthalene-type epoxy resin. One kind of these resins may be used alone, or two or more kinds thereof may be used in combination.

In the case of using the linear epoxy resin, the linear epoxy resin needs to include a linear epoxy resin having a degree of polymerization of 2 or more. When a linear epoxy resin having a degree of polymerization of less than 2 is used alone, the epoxy resin to be obtained does not exhibit the effect of introduction of a linear skeleton into its molecular structure and thereby cracks are generated in a cured product. The degree of polymerization of the linear epoxy resin is preferably from 2 to 10. When a linear epoxy resin having a degree of polymerization of 11 or more is included, the heat resistance of the cured product tends to decrease.

In the case of using the epoxy acrylate resin, the epoxy acrylate resin preferably includes an epoxy acrylate resin having a degree of polymerization of from 2 to 10. When an epoxy acrylate resin having a degree of polymerization of less than 2 is used alone, there is a tendency that the epoxy resin to be obtained does not exhibit the effect of introduction of a linear skeleton into its molecular structure and thereby cracks are generated in a cured product. When an epoxy acrylate resin having a degree of polymerization of 11 or more is included, the epoxy resin to be obtained tends to provide a cured product having lower heat resistance.

In the case of using the novolac-type epoxy resin, the novolac-type epoxy resin preferably includes a novolac-type epoxy resin having a degree of polymerization of from 3 to 10. When a novolac-type epoxy resin having a degree of polymerization of less than 3 is used alone, the epoxy resin to be obtained tends to have lower heat resistance. When a novolac-type epoxy resin having a degree of polymerization of 11 or more is included, the novolac-type epoxy resin is not compatible with the linear epoxy resin and the epoxy acrylate resin, or even when the novolac-type epoxy resin is compatible with these resins, the epoxy resin to be obtained tends to have a high viscosity and the cured product tends to be brittle.

When the epoxy resin is obtained by reacting at least one selected from the group consisting of a linear epoxy resin and an epoxy acrylate resin with at least one of a novolac-type epoxy resin and a naphthalene-type epoxy compound, preferably 2 to 50 epoxy equivalents, more preferably 3 to 40 epoxy equivalents of the at least one selected from the group consisting of a linear epoxy resin and an epoxy acrylate resin is reacted with 100 epoxy equivalents of the at least one of a novolac-type epoxy resin and a naphthalene-type epoxy compound. When the at least one selected from the group consisting of a linear epoxy resin and an epoxy acrylate resin is used in excess of 50 epoxy equivalents, the epoxy resin to be obtained tends to provide a cured product having a lower glass transition temperature as compared to a mixture obtained by mixing the at least one selected from the group consisting of a linear epoxy resin and an epoxy acrylate resin and the at least one of a novolac-type epoxy resin and a naphthalene-type epoxy compound without allowing for their reaction. In contrast, when the at least one selected from the group consisting of a linear epoxy resin and an epoxy acrylate resin is used below 2 epoxy equivalents, the epoxy resin to be obtained does not exhibit the effect of introduction of a linear skeleton into its molecular structure and thereby cracks are generated in the cured product.

In the reaction between the at least one selected from the group consisting of a linear epoxy resin and an epoxy acrylate resin and the at least one of a novolac-type epoxy resin and a naphthalene-type epoxy compound, it is preferred to use a curing accelerator. Examples of the curing accelerator include: a metal carboxylate such as zinc naphthenate, zinc octoate, iron octoate, tin octoate, zinc naphthylate, iron naphthylate, and tin naphthylate; and a peroxide such as 2,5-dimethyl-2,5(dibenzoylperoxy) hexane. One kind of these curing accelerators may be used alone, or two or more kinds thereof may be used in combination. The amount of the curing accelerator used is generally from 0.01 part by weight to 1 part by weight with respect to 100 parts by weight of the thermosetting resin composition including a base material and a curing agent.

The weight average molecular weight of the epoxy resin obtained by reacting the at least one selected from the group consisting of a linear epoxy resin and an epoxy acrylate resin with the at least one of a novolac-type epoxy resin and a naphthalene-type epoxy compound needs to be from 2,000 to 10,000, and is preferably from 2,500 to 8,000. When the weight average molecular weight of the epoxy resin is less than 2,000, the mechanical strength becomes insufficient. In contrast, when the weight average molecular weight of the epoxy resin exceeds 10,000, the epoxy resin is in a solid form at room temperature and its handling becomes difficult.

It should be noted that the weight average molecular weight of the epoxy resin in the embodiment refers to a value measured with a device described below using tetrahydrofuran as a developing solvent at a sample concentration of 0.1 wt % and a flow rate at the measurement of 1 mL/minute.

Instrument used: HLC-8320 manufactured by TOSOH CORPORATION
Column: TSK-GEL 1000 to 4000
Standard sample: polystyrene For improving the heat resistance, it is preferred to add at least one selected from a bismaleimide and an isocyanurate to the liquid thermosetting resin composition for insulating a stator coil of a rotating electric machine according to the embodiment of the present invention. Examples of the bismaleimide include
4,4'-diphenylmethanebismaleimide, m-phenylenebismaleimide, bisphenol A diphenyl ether bismaleimide,
3,3'-dimethyl-5,5'-diethyl-4,4'-diphenylmethanebismaleimide, 4-methyl-1,3-phenylenebismaleimide, and
1,6'-bismaleimido-(2,2,4-trimethyl)hexane. In addition, examples of the isocyanurate include triallyl isocyanurate and trimethallyl isocyanurate. One kind of these may be used alone, or two or more kinds thereof may be used in combination. The amount of the bismaleimide and the isocyanurate used is preferably from 10 parts by weight to 50 parts by weight, more preferably from 15 parts by weight to 30 parts by weight, with respect to 100 parts by weight of the epoxy resin obtained through the reaction.

In addition, a curing agent may be added to the liquid thermosetting resin composition for insulating a stator coil of a rotating electric machine according to the embodiment of the present invention as required. Examples of the curing agent include an acid anhydride, an amide-based compound, a phenol-based compound, and an imidazole compound. One kind of these curing agents may be used alone, or two or more kinds thereof may be used in combination.

Specific examples of the acid anhydride include: an aromatic carboxylic acid anhydride such as phthalic anhydride, trimellitic anhydride, pyromellitic anhydride, benzophenonetetracarboxylic anhydride, ethylene glycol trimellitic anhydride, or biphenyltetracarboxylic anhydride; an anhydride of an aliphatic carboxylic acid such as azelaic acid, sebacic acid, or decanedioic acid; and an alicyclic carboxylic acid anhydride such as tetrahydrophthalic anhydride, hexahydrophthalic anhydride, nadic anhydride, chlorendic anhydride, or himic anhydride. The acid anhydride is used in such an amount that the equivalent ratio of a carboxyl group with respect to an epoxy group in the epoxy resin obtained through the reaction becomes from 0.3 to 1.5 in general, more preferably from 0.5 to 1.2. When the acid anhydride is used at an equivalent ratio of less than 0.3, the heat resistance becomes lower. In contrast, when the acid anhydride is used at an equivalent ratio exceeding 1.5, usable lifetime is shortened.

A specific example of the amide-based compound is dicyandiamide. In addition, specific examples of the phenol-based compound include naphthol and cresol. In addition, specific examples of the imidazole-based compound include 2-methylimidazole (2MZ), 2-ethyl-4-methylimidazole (2E4MZ), 2-undecylimidazole (C11Z), 2-heptadecylimidazole (C17Z), 2-phenylimidazole (2PZ), 1-benzyl-2-methylimidazole (1B2MZ), and 1-cyanoethyl forms, 1-cyanoethyl form trimellitic acid salts, azine compounds, quaternary salts, isocyanuric acid salts, and hydroxymethyl forms thereof. The curing agent is used in such an amount that the equivalent ratio of the curing agent with respect to an epoxy group in the epoxy resin obtained through the reaction becomes from 0.2 to 2.0 in general, preferably from 0.3 to 1.5.

A cured product using the liquid thermosetting resin composition according to the embodiment of the present invention has remarkably less cracks as compared to a cured product using a liquid thermosetting resin composition obtained by mixing the at least one selected from the group consisting of a linear epoxy resin and an epoxy acrylate resin, the at least one of a novolac-type epoxy resin and a naphthalene-type epoxy compound, the curing agent, and the curing accelerator, and further, has no reduction in the glass transition temperature. In addition, a hydroxyl group that does not contribute to the reaction remains in a long chain skeleton in the epoxy resin to be obtained through the reaction described above, and hence, the liquid thermosetting resin composition according to the embodiment of the present invention also has the effect of having good adhesion properties to electric wires. Further, in addition to the characteristics described above, the liquid thermosetting resin composition according to the embodiment of the present invention has a low viscosity and a remarkably long usable lifetime, and hence, is useful for applications for lamination or casting as well as applications for insulating stator coils of rotating electric machines.

A rotating electric machine according to the embodiment of the present invention includes a rotor and a stator being disposed outside or inside of the rotor and having a plurality of slots, in which the plurality of slots include a winding wire coated with a cured product of the liquid thermosetting resin composition for insulating a stator coil of a rotating electric machine described above.

Figure 1:
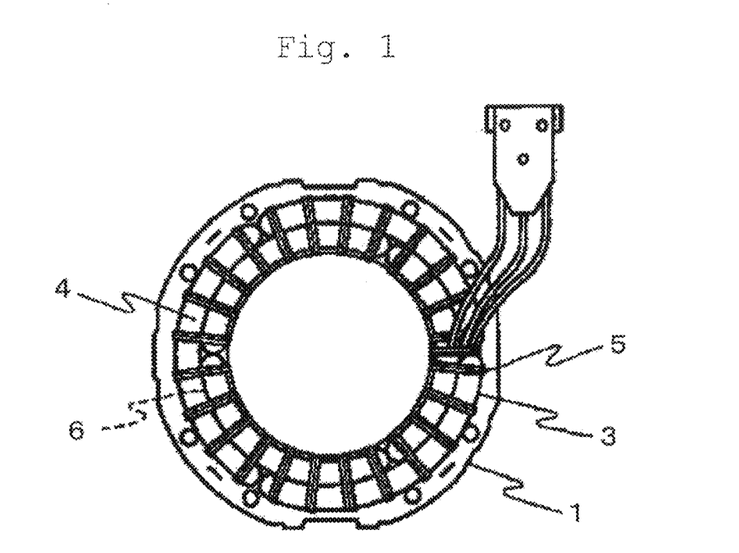
FIG. 1 is a top view of a rotating electric machine according to embodiment 1 of the present invention.
Figure 2:
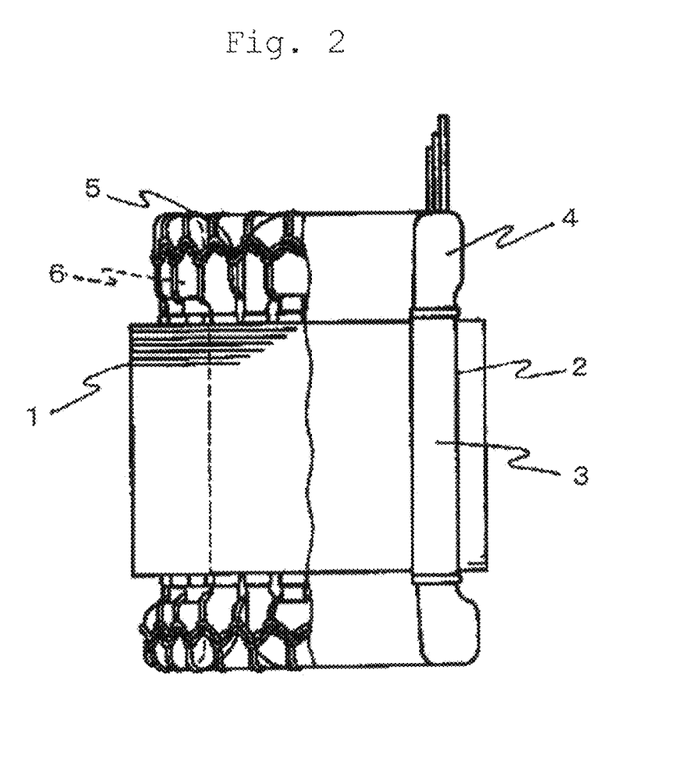
FIG. 2 is a side view of the rotating electric machine according to embodiment 1 of the present invention.

A stator according to the embodiment of the present invention is described based on the drawings. As illustrated in FIGS. 1 and 2, the stator includes: a stator core 1 prepared by laminating iron plates cylindrically; a plurality of slots 2 formed on the inner periphery of the stator core 1 in the axial direction; an insulating film 3 provided inside of each of the plurality of slots 2; an electric wire 4 wound around the plurality of slots 2; binding strings 5 for banding the electric wire 4; and a cured product 6 of the liquid thermosetting resin composition coating the stator. Such stator can be obtained by subjecting the plurality of slots 2 to insulation treatment, followed by winding the electric wire 4 around the slots 2 a predetermined number of times, coating the stator with the above-mentioned liquid thermosetting resin composition for insulating a stator coil of a rotating electric machine, and then, curing the liquid thermosetting resin composition, to thereby conduct insulation treatment. A rotating electric machine is manufactured by disposing the stator outside or inside of a rotor.

It should be noted that the rotating electric machine according to the embodiment of the present invention only needs to be a rotating electric machine in which a stator having a plurality of slots is impregnated with the above-mentioned liquid thermosetting resin composition. The stator having a plurality of slots may or may not incorporate an electric wire or a coil. In addition, vacuum impregnation may be performed with a view to enhancing impregnation property into a stator core, impregnation property into spaces between winding wires, and impregnation property into an insulating layer such as an insulating film performing insulation of a coil. In the case of a stator using an insulating film, an insulated coil is manufactured by winding an insulating film around a coil conductor, vacuum-impregnating the resultant layer wound around with the above-mentioned liquid thermosetting resin composition under pressure under known conditions, and then, inserting the resultant product into a mold and performing heating and pressure molding. As the molding conditions in this case, a heating temperature of from 100° C. to 250° C., a molding pressure of from 5 kg/cm$^2$ to 100 kg/cm$^2$, and a heating time period of from 4 hours to 24 hours are adopted. Alternatively, in other cases, a heating temperature of from 100° C. to 250° C. and a heating time period of from 0.5 hour to 20 hours are adopted. This provides an insulated coil and a winding wire having excellent electrical properties and excellent thermal properties. Cases where the molding conditions are out of the above-mentioned ranges are not preferred because, in such cases, the insulated coil to be obtained has low interlayer adhesion, which results in a significant decrease in the electrical properties in its thermal deterioration, and in addition, lifting or peeling occurs in the insulating layer. Further, cases where the molding conditions are out of the above-mentioned ranges are not preferred because, in such cases, fixing strength between electric wires becomes low, which results in a decrease in the electrical properties in thermal deterioration or mechanical deterioration.

According to the embodiment of the present invention, it is possible to provide a liquid thermosetting resin composition exhibiting excellent heat resistance and excellent mechanical characteristics as compared to the related-art liquid thermosetting resin compositions. A rotating electric machine using a stator insulated with this liquid thermosetting resin composition can have excellent electrical properties.

EXAMPLES

The present invention is specifically described below by way of Examples and Comparative Examples. However, the present invention is not limited thereto.

Example 1

20 Parts by weight of a bisphenol A-type epoxy resin (a mixture of an epoxy resin having degrees of polymerization of from 1 to 4, epoxy equivalent: 190) and 1 part by weight of zinc naphthenate were added to 100 parts by weight of a m-cresol novolac-type epoxy resin (a mixture of an epoxy resin having degrees of polymerization of from 3 to 6, epoxy equivalent: 200), and then, the resultant was heated while being stirred at 150° C. for 2 hours. The obtained epoxy resin had a weight average molecular weight of 3,400. After cooling to 100° C., 50 parts by weight of bisphenol A diphenyl ether bismaleimide were added thereto, and the resultant was stirred at the same temperature for 2 hours. After cooling to 80° C. or less, 60 parts by weight of methyltetrahydrophthalic acid anhydride as a curing agent were added thereto. Thus, a liquid thermosetting resin composition of Example 1 was prepared. The composition was cured by heating and the obtained cured product was evaluated for heat resistance and crack property. For the heat resistance, the glass transition temperature was measured with TMA SS6000 (by Seiko Instruments Inc.) at a temperature raising rate of 10° C./minute. For the crack property, a cured product having a thickness of 3 mm was retained in a curing furnace at 220° C. for 10 days, and then, its external appearance was examined to evaluate the presence or absence of cracks. The obtained cured product had a glass transition temperature of 150° C. and no cracks were observed. As just described, it was confirmed that the liquid thermosetting resin composition of Example 1 had excellent heat resistance and excellent mechanical characteristics.

Example 2

An epoxy resin was obtained in the same manner as in Example 1 except that 50 parts by weight of a bisphenol F-type epoxy resin (a mixture of an epoxy resin having degrees of polymerization of from 1 to 5, epoxy equivalent: 190) were used instead of 20 parts by weight of the bisphenol A-type epoxy resin (a mixture of an epoxy resin having degrees of polymerization of from 1 to 4, epoxy equivalent: 190). The obtained epoxy resin had a weight average molecular weight of 5,100. By using the obtained epoxy resin, a liquid thermosetting resin composition of Example 2 was prepared in the same manner as in Example 1 except that 50 parts by weight of triallyl isocyanurate were used instead of 50 parts by weight of bisphenol A diphenyl ether bismaleimide. The characteristics of a cured product were examined in the same manner as in Example 1. As a result, it was confirmed that the cured product had a glass transition temperature of 139° C., generated no cracks, and had excellent heat resistance and excellent mechanical characteristics.

Example 3

An epoxy resin was obtained in the same manner as in Example 1 except that 100 parts by weight of a phenol novolac-type epoxy resin (a mixture of an epoxy resin having degrees of polymerization of from 3 to 6, epoxy equivalent: 200) were used instead of 100 parts by weight of the m-cresol novolac-type epoxy resin (a mixture of an epoxy resin having degrees of polymerization of from 3 to 6, epoxy equivalent: 200) and 10 parts by weight of a bisphenol A-type epoxy resin (a mixture of an epoxy resin having degrees of polymerization of from 5 to 10, epoxy equivalent: 450) were used instead of 20 parts by weight of the bisphenol A-type epoxy resin (a mixture of an epoxy resin having degrees of polymerization of from 1 to 4, epoxy equivalent: 190). The obtained epoxy resin had a weight average molecular weight of 3,000. By using the obtained epoxy resin, a liquid thermosetting resin composition of Example 3 was prepared in the same manner as in Example 1 except that the amount of bisphenol A diphenyl ether bismaleimide was changed to 30 parts by weight. The characteristics of a cured product were examined in the same manner as in Example 1. As a result, it was confirmed that the cured product had a glass transition temperature of 140° C., generated no cracks, and had excellent heat resistance and excellent mechanical characteristics.

Example 4

An epoxy resin was obtained in the same manner as in Example 1 except that 100 parts by weight of 1,5-naphthalene diglycidyl ether naphthalene were used instead of 100 parts by weight of the m-cresol novolac-type epoxy resin (a mixture of an epoxy resin having degrees of polymerization of from 3 to 6, epoxy equivalent: 200) and 20 parts by weight of an epoxy acrylate resin (a mixture of an epoxy resin having degrees of polymerization of from 1 to 15) were used instead of 20 parts by weight of the bisphenol A-type epoxy resin (a mixture of an epoxy resin having degrees of polymerization of from 1 to 4, epoxy equivalent: 190). The obtained epoxy resin had a weight average molecular weight of 6,500. By using the obtained epoxy resin, a liquid thermosetting resin composition of Example 4 was prepared in the same manner as in Example 1. The characteristics of a cured product were examined in the same manner as in Example 1. As a result, it was confirmed that the cured product had a glass transition temperature of 162° C., generated no cracks, and had excellent heat resistance and excellent mechanical characteristics.

Example 5

An epoxy resin was obtained in the same manner as in Example 1 except that 50 parts by weight of a brominated bisphenol A-type epoxy resin (a mixture of an epoxy resin having degrees of polymerization of from 1 to 5, epoxy equivalent: 500) were used instead of 20 parts by weight of the bisphenol A-type epoxy resin (a mixture of an epoxy resin having degrees of polymerization of from 1 to 4, epoxy equivalent: 190). The obtained epoxy resin had a weight average molecular weight of 5,600. By using the obtained epoxy resin, a liquid thermosetting resin composition of Example 5 was prepared in the same manner as in Example 1 except that 50 parts by weight of triallyl isocyanurate were used instead of 50 parts by weight of bisphenol A diphenyl ether bismaleimide. The characteristics of a cured product were examined in the same manner as in Example 1. As a result, it was confirmed that the cured product had a glass transition temperature of 156° C., generated no cracks, and had excellent heat resistance and excellent mechanical characteristics.

Example 6

A stator coil having an enamel electric wire wound thereon was impregnated with the liquid thermosetting resin composition of Example 1 under normal pressure. After that, the resultant was cured by heating at 160° C. for 8 hours. A rotating electric machine was produced by using the stator. The obtained rotating electric machine was subjected to heat cycles of from 150° C. to −40° C., and then, the insulation resistance was measured. As a result, it was found that the insulation resistance was good and comparable to that before the heat cycle test (an insulation resistance of 1,000 MΩ or more). In addition, an external examination found no cracks.

Example 7

Around a coil conductor having a cross section of 40×10 mm and being formed of 2×20 stacks of double glass envelope flat copper wires each having a size of 2×5×2,000 mm, an integrated mica tape backed by glass cloth (manufactured by Arisawa Mfg. Co., Ltd., thickness: 0.025 mm) was half-lap wound 12 times, and further, a Tetoron (trademark) tape (manufactured by TEIJIN LIMITED, thickness: 0.13 mm) was wound once as a protective tape. The resultant was vacuum-impregnated with the liquid thermosetting resin composition of Example 1 under a pressure of 0.1 mmHg or less for 120 minutes, and then, pressurized at a pressure of 3 kg/cm² for 180 minutes, followed by insertion into a mold and heating and pressure molding under the conditions of a temperature of 150° C., a pressure of 20 kg/cm², and a time period of 6 hours. After that, curing was further conducted under the conditions at 150° C. for 16 hours. Thus, an insulated coil was obtained. Initial Δ tan δ, breakdown voltage, and Δ tan δ after 16 days at 180° C. were measured. As a result, it was found that the initial Δ tan δ was 0.02, the breakdown voltage was 105 kV, and the Δ tan δ after 16 days at 180° C. was 0.16. The characteristics of the insulated coil were good.

Comparative Example 1

A liquid thermosetting resin composition of Comparative Example 1 was prepared by adding 20 parts by weight of a bisphenol A-type epoxy resin (a mixture of an epoxy resin having degrees of polymerization of from 1 to 5, epoxy equivalent: 190), 1 part by weight of zinc naphthenate, and 60 parts by weight of methyltetrahydrophthalic acid anhydride serving as a curing agent to 100 parts by weight of a m-cresol novolac-type epoxy resin (a mixture of an epoxy resin having degrees of polymerization of from 3 to 6, epoxy equivalent: 200). The characteristics of a cured product were examined in the same manner as in Example 1. As a result, it was confirmed that the cured product had a glass transition temperature of 131° C. and that cracks were generated.

Comparative Example 2

A liquid thermosetting resin composition of Comparative Example 2 was prepared in the same manner as in Comparative Example 1 except that 200 parts by weight of a bisphenol F-type epoxy resin (a mixture of an epoxy resin having degrees of polymerization of from 1 to 5, epoxy equivalent: 190) were used instead of 20 parts by weight of the bisphenol A-type epoxy resin (a mixture of an epoxy resin having degrees of polymerization of from 1 to 5, epoxy equivalent: 190). The characteristics of a cured product were examined in the same manner as in Example 1. As a result, it was confirmed that the cured product had a glass transition temperature of 122° C. and that cracks were generated.

Comparative Example 3

A liquid thermosetting resin composition of Comparative Example 3 was prepared in the same manner as in Comparative Example 1 except that the amount of the m-cresol novolac-type epoxy resin (a mixture of an epoxy resin having degrees of polymerization of from 3 to 6, epoxy equivalent: 200) was changed to 90 parts by weight and 2 parts by weight of a bisphenol A-type epoxy resin (a mixture of an epoxy resin having degrees of polymerization of from 1 to 12, epoxy equivalent: 470) were used instead of 20 parts by weight of the bisphenol A-type epoxy resin (a mixture of an epoxy resin having degrees of polymerization of from 1 to 5, epoxy equivalent: 190). The characteristics of a cured product were examined in the same manner as in Example 1. As a result, it was confirmed that the cured product had a glass transition temperature of 118° C. and that cracks were generated.

Comparative Example 4

A liquid thermosetting resin composition of Comparative Example 4 was prepared in the same manner as in Comparative Example 1 except that 85 parts by weight of 1,5-naphthalene diglycidyl ether naphthalene were used instead of 100 parts by weight of the m-cresol novolac-type epoxy resin (a mixture of an epoxy resin having degrees of polymerization of from 3 to 6, epoxy equivalent: 200) and 1 part by weight of a bisphenol A-type epoxy resin (a mixture of an epoxy resin having degrees of polymerization of from 1 to 15, epoxy equivalent: 500) was used instead of 20 parts by weight of the bisphenol A-type epoxy resin (a mixture of an epoxy resin having degrees of polymerization of from 1 to 5, epoxy equivalent: 190). The characteristics of a cured product were examined in the same manner as in Example 1. As a result, it was confirmed that the cured product had a glass transition temperature of 128° C. and that cracks were generated.

Comparative Example 5

200 Parts by weight of a bisphenol F-type epoxy resin (a mixture of an epoxy resin having degrees of polymerization of from 1 to 5, epoxy equivalent: 190) and 1 part by weight of zinc naphthenate were added to 85 parts by weight of 1,5-naphthalene diglycidyl ether naphthalene, and then, the resultant was heated while being stirred at 150° C. for 1 hour. The obtained epoxy resin had a weight average molecular weight of 1,600. By using the obtained epoxy resin, a liquid thermosetting resin composition of Comparative Example 5 was prepared in the same manner as in Example 1. The characteristics of a cured product were examined in the same manner as in Example 1. As a result, it was confirmed that the cured product had a glass transition temperature of 128° C. and that cracks were generated.

REFERENCE SIGNS LIST

1 stator core, 2 slot, 3 insulating film, 4 electric wire, 5 binding string, 6 cured product of liquid thermosetting resin composition

The invention claimed is:

1. A liquid thermosetting resin composition, comprising:
an epoxy resin in which at least one selected from the group consisting of a linear epoxy resin having a degree of polymerization of 2 or more and an epoxy acrylate resin, and at least one of a novolac-type epoxy resin, are linked to each other via an ether linkage,
wherein the novolac-type epoxy resin is a phenol novolac-type epoxy resin of formula (4):

(4)

wherein n represents a positive integer, and
wherein a weight average molecular weight of the epoxy resin is from 2,000 to 10,000.

2. The composition according to claim 1, wherein the novolac-type epoxy resin has a degree of polymerization of 3 or more.

3. The composition according to claim 1, wherein the epoxy resin is obtained by reacting 2 to 50 epoxy equivalents of the at least one selected from the group consisting of a linear epoxy resin and an epoxy acrylate resin with 100 epoxy equivalents of the novolac-type epoxy resin.

4. The composition according to claim 1, further comprising: at least one selected from the group consisting of a bismaleimide and an isocyanurate.

5. A rotating electric machine, comprising: a rotor; and a stator being disposed outside or inside of the rotor and having a plurality of slots, wherein the plurality of slots comprise a winding wire coated with a cured product of the liquid thermosetting resin composition according to claim 1.

6. The composition according to claim 1, wherein the epoxy resin is obtained by reacting 3 to 40 epoxy equivalents of the at least one selected from the group consisting of a linear epoxy resin and an epoxy acrylate resin with 100 epoxy equivalents of the novolac-type epoxy resin.

7. A method of manufacturing a rotating electric machine, the method comprising:
mixing an epoxy resin in which at least one selected from the group consisting of a linear epoxy resin having a degree of polymerization of 2 or more and an epoxy acrylate resin, and at least one of a novolac-type epoxy resin, are linked to each other via an ether linkage, wherein the novolac-type epoxy resin is a phenol novolac-type epoxy resin of formula (4):

(4)

wherein n represents a positive integer, and
wherein a weight average molecular weight of the epoxy resin is from 2,000 to 10,000, with at least one selected from the group consisting of a bismaleimide and an isocyanurate, to obtain a liquid thermosetting resin composition;
subjecting a plurality of slots of a stator to insulation treatment, followed by winding an electric wire around the slots a predetermined number of times;
coating the stator with the liquid thermosetting resin composition, followed by curing the liquid thermosetting resin composition, to obtain an insulation-treated stator; and
disposing a rotor inside or outside of the stator.

8. A liquid thermosetting resin composition, comprising:
an epoxy resin in which at least one selected from the group consisting of a linear epoxy resin having a degree of polymerization of 2 or more and an epoxy acrylate resin, and at least one of a novolac-type epoxy resin, are linked to each other via an ether linkage,
wherein the novolac-type epoxy resin is a cresol novolac-type epoxy resin of formula (5):

(5)

wherein:
m represents 1 or 2;
n represents a positive integer;
R represents H or an alkyl group having 1 to 3 carbon atoms; and
X represents a direct linkage or a methylene group having 1 to 3 carbon atoms, and
wherein a weight average molecular weight of the epoxy resin is from 2,000 to 10,000.

9. The composition according to claim 8, wherein the novolac-type epoxy resin has a degree of polymerization of 3 or more.

10. The composition according to claim 8, wherein the epoxy resin is obtained by reacting 2 to 50 epoxy equivalents of the at least one selected from the group consisting of a linear epoxy resin and an epoxy acrylate resin with 100 epoxy equivalents of the novolac-type epoxy resin.

11. The composition according to claim 8, wherein the epoxy resin is obtained by reacting 3 to 40 epoxy equivalents of the at least one selected from the group consisting of a linear epoxy resin and an epoxy acrylate resin with 100 epoxy equivalents of the novolac-type epoxy resin.

12. The composition according to claim 8, further comprising: at least one selected from the group consisting of a bismaleimide and an isocyanurate.

13. A rotating electric machine, comprising: a rotor; and a stator being disposed outside or inside of the rotor and having a plurality of slots, wherein the plurality of slots comprise a winding wire coated with a cured product of the liquid thermosetting resin composition according to claim 8.

14. A method of manufacturing a rotating electric machine, the method comprising:

mixing an epoxy resin in which at least one selected from the group consisting of a linear epoxy resin having a degree of polymerization of 2 or more and an epoxy acrylate resin, and at least one of a novolac-type epoxy resin, are linked to each other via an ether linkage, wherein the novolac-type epoxy resin is a cresol novolac-type epoxy resin of formula (5):

wherein:

m represents 1 or 2;

n represents a positive integer;

R represents H or an alkyl group having 1 to 3 carbon atoms; and

X represents a direct linkage or a methylene group having 1 to 3 carbon atoms, and wherein a weight average molecular weight of the epoxy resin is from 2,000 to 10,000, with at least one selected from the group consisting of a bismaleimide and an isocyanurate, to obtain a liquid thermosetting resin composition;

subjecting a plurality of slots of a stator to insulation treatment, followed by winding an electric wire around the slots a predetermined number of times;

coating the stator with the liquid thermosetting resin composition, followed by curing the liquid thermosetting resin composition, to obtain an insulation-treated stator; and disposing a rotor inside or outside of the stator.

* * * * *